Figure 1:
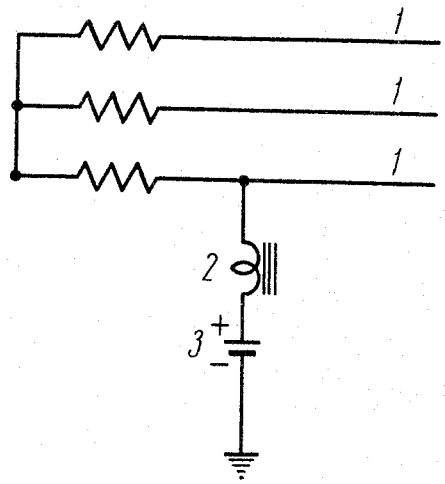

3,278,802
METHOD FOR DRYING THE INSULATION OF ELECTRICAL CABLES LAID IN A DAMP ATMOSPHERE, IN PARTICULAR CABLES OF MINE NETWORKS HAVING INSULATED NEUTRAL AND AN ARRANGEMENT FOR THE REALIZATION OF SUCH METHOD
Alexey Jakovlevich Fanin and Vladimir Dmitrievich Kochetkov, both of Donetsk, U.S.S.R., assignors to Donetsky Nauchno-Issledovatelsky Ugolny Institute
Filed June 7, 1963, Ser. No. 286,268
4 Claims. (Cl. 317—18)

This invention relates to the field of electrical engineering, and more specifically to drying of the insulation of cables laid in a damp atmosphere, in particular, cables of mine networks having insulated neutral.

Numerous investigations have proved that all insulating materials, when they absorb moisture, show impaired electrical characteristics: their specific volumetric resistance drops, their angle of dielectric losses increases, also their dielectric penetrance.

For organic dampproof materials, it is not accidental pores and capillaries which play the principal role in absorption and penetration of water vapour, but rather the ability of direct penetration of water molecules between the molecules of the insulating material (polymer). As the size of the water molecule is over 100 times smaller than that of the high polymer molecule, the water molecules can easily penetrate into the polymer (insulating material) as a result of thermal relative movement of the polymer molecules themselves and of their chains.

The problem of improving the electrical insulation is of great practical importance, since nearly all electrical and radio constructions operated in air of 60–80% relative humidity. Thus, the moisture content in a paper insulated telephone cable reaches 7.8% with the relative air humidity varying from 0 to 60%, while the capacity of the cable increases almost three times, while the angle of dielectric losses at 60% humidity increases 10–12 times. The kilometric damping rises from the initial value of 0.135 to 0.3 nep./km., while the insulation resistance drops from 1500 to 0.06 megohm/km. These values show that a cable with a paper humidity above 5% cannot be used owing to its excessive damping.

Of special importance is the problem of electrical insulation drying in mines where the relative air humidity may reach 98%.

Investigations of the insulation of main cable networks in mines have shown that the pure insulation resistance of such networks is very low, and in a number of mine districts in the U.S.S.R. approximately 80% of the local mine networks show a pure resistance as low as 5 kohms.

These specific conditions of operation of electrical cable networks in mines lower the quality of their insulation, resulting in relatively frequent breakdowns of the insulation of such networks, interfering with the normal operation of electrical equipment.

In cable networks with damp insulation, the leakage relays operate to disconnect the network whose insulation is faulty, causing idle standing of the electrical equipment. A low insulation resistance network may cause fire in the mines, explosion of methane and/or coal dust, electric shock to the workpeople, erratic operation of the signal lines, etc.

A cable with damp insulation must be disconnected, sent up to the surface for drying, then again lowered into the mine and reconnected. This involves heavy costs.

The principal aim of this invention is to enable to improve the insulation of electrical cable networks laid in a damp atmosphere, without having to disconnect the cable, and, in particular, in the case of mines, without having to send the cable up to the surface.

A further aim of the invention is to ensure automatic increase of the pure insulation resistance of networks from a few kohms to several hundreds of kohms, and thereafter automatic continuous maintenance of the insulation resistance at such level.

A still further aim of the invention is to improve safety by lowering the capacity of the cable network to earth, and thus reducing the current flowing through a person that may accidentally touch the network.

Also an aim of the invention is to improve the operating characteristics of the electrical cables and equipment.

The problems thus posed are solved, in accordance with the invention, by making use of the electric osmotic effects for drying of cables laid in a damp atmosphere, and, in particular, of cable networks with insulated neutral in mines.

Figure 2:
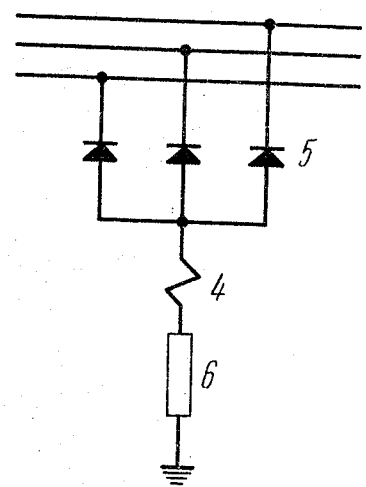
Figure 3:
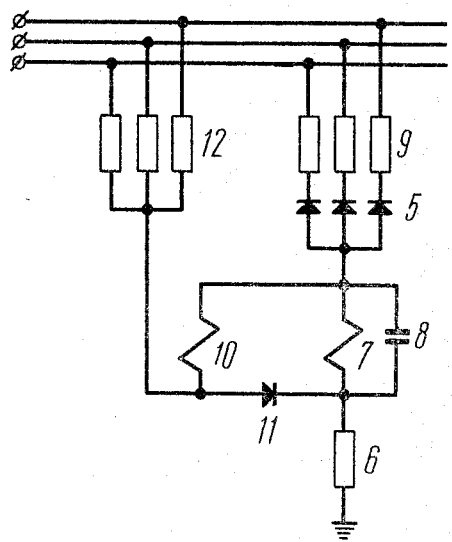
Figure 4:
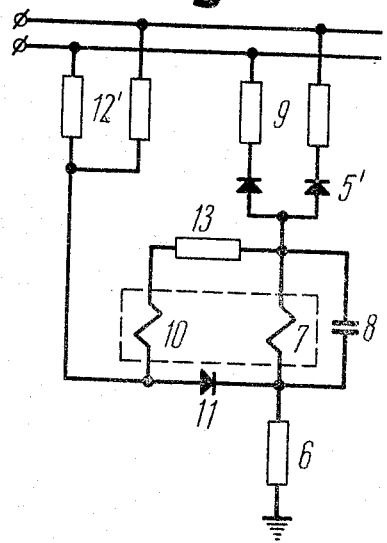

In order to render this invention more clear to persons competent in the field, a detailed description is given below of the proposed method of drying the insulation of a cable, such description referring to the drawing attached as an example, where FIG. 1 is to explain the principle of the method proposed by the invention, while FIGS. 2, 3 and 4 show the connection diagrams of several possible alternative arrangements based on the application of the proposed method.

For continuous automatic improving (drying) of the insulation of an electrical cable network with insulated neutral, to one of the conductors of such network 1, without de-energizing it, through choke 2, the positive of a D.C. source 3 is applied, FIG. 1, the negative of the source being earthed.

So connected, all the conductors of the cable network have a positive potential to earth applied to them, thus promoting removal of moisture from the damp insulation under the action of electric osmotic forces.

In networks where leakage relays are used, the latter are connected so that the conductors have a positive potential to earth applied to them, as shown in FIG. 2, where: 4 is a current relay, 5 are semi-conductor rectifiers, 6 is a resistor. Similarly, in this case also the positive potential of the conductors to earth causes the leakage current to flow in a direction to promote removal of moisture from the damp insulation under the action of electric osmotic forces. The setting of the relay is chosen for the relay to operate at a 10 ma. leakage current flowing through it.

In the arrangement whose connections are shown in FIG. 3, three star-connected rectifiers 5, as in FIG. 2, are also used; they are connected to the network so that the conductors of the cable have a positive potential to earth applied to them. Included is also a double-winding electromagnetic current relay, whose one winding 7, shunted by condenser 8, is connected as follows: one of its ends through a resistor 6 to earth; the other end through the semi-conductor rectifiers 5 and ohmic resistors 9 to the phases of the network being protected. The other winding 10 of this relay is connected as follows: one of its ends to the neutral point of the star-connected rectifiers 5; the other end through a controlled diode 11 and resistor 6 to earth, and also through star-connected resistors 12 to the phases of the network being protected. The magnetic fluxes produced by the windings 7 and 10 of the double-winding relay are opposed. Thus, a leakage relay of high sensitivity is obtained, since the resulting magnetic flux is the difference of the two individual magnetic fluxes produced by the windings 7 and 10, and a differential system, as is known, possesses high sensitivity.

A feature of the leakage relay described, similar to the relay shown in FIG. 2, is that the positive potential of the cable conductors to earth causes the leakage current to flow in a direction to promote removal of moisture from the damp insulation under the action of electric osmotic forces. A further feature of this relay is self-control of the operative condition of the relay windings. In the event of discontinuity in one of the windings 7 or 10, the relay operates to disconnect the network being controlled, this being of particular importance, for example, in networks of gas- and dust-hazardous mines; see "Leakage in Mine Electric Circuits," by R. M. Leibov, 1952 edition, FIG. 38, pp. 114–118 and 138–140.

The relay just described possesses almost ideal (required) protective characteristics. In a protection system of a 127 v. network, the leakage relay operated at approximately 2.5 kohm single-phase leakage, at 2.45 kohm at double-phase, 2.45 kohm at three-phase and at 2.45 kohm critical insulation resistance. The described leakage relay operates at 2.5, 2.9, 3.0 and 3.0 kohm, respectively.

By varying the relative values of the resistances 6 and 12, it is possible to adjust the relay to operate with leakage insulation resistance dropping down to 2.5 kohm single-phase, 5 kohm two-phase, and 7.5 kohm three-phase.

FIG. 4 shows a connection diagram similar to that shown in FIG. 3, but differing from the latter in only that the leakage relay having two windings 7 and 10 connected in opposition is used for protection of a single-phase network. As shown in FIG. 4, instead of the star-connected rectifiers 5, two interconnected rectifiers $5^1$ are used. Also, instead of the star-connected resistors 12, two interconnected resistors $12^1$ are used. Inserted between the windings 7 and 10, is a resistor 13.

If the insulation is not faulty, no leakage current flows. An auxiliary current flows through both windings of the relay, and their resulting magnetic flux is inadequate for the relay to operate. With the insulation resistance dropping, the leakage current rises, and so also does the operating current flowing through the windings of the relay. The auxiliary current flowing through the controlled diode 11 decreases. With the insulation resistance dropping still further, the current flowing through the leakage relay continues to rise, and when it reaches a value exceeding that of the auxiliary current, the diode 11 blocks. The operating current only then flows through the winding 7. When the difference of the magnetic fluxes becomes adequate for the relay to operate, the latter operates and sends a signal to show that the insulation of the network is faulty.

Tests have confirmed the efficacy of the method offered by this invention. Thus, connection of the leakage relay in accordance with the diagram shown in FIG. 4, in a mine network of shaft signalling 127 v. installations, without deenergizing the latter, produced an increase in the pure insulation resistance of such networks, from 4–18 kohms to 200–400 kohms after a few days. During two years of actual service, the pure insulation resistance of the networks has been automatically maintained at this level.

Connection of the leakage relay in accordance with the diagram shown in FIG. 3, in 380 v. and 660 v. three-phase local mine networks, without de-energizing the latter, produced an increase of the pure insulation resistance of such networks from 6–30 kohms to 75–200 kohms, and the insulation resistance has been automatically maintained at this level during one year of further service.

What we claim is:

1. Apparatus for checking the state of and for drying, by means of electrical osmosis, the insulation of a three-phase electrical network including insulation of components thereof comprising a two-coil electromagnetic current relay having oppositely connected coils, a combination of star-connected resistors, a combination of star-connected rectifiers having a common star point, said rectifiers and said resistors being respectively in series connection between the star point and the three phases of the electrical network, a capacitor shunting one coil of said electromagnetic relay, a resistor connected between earth and one side of said one coil, a connection between the star point and the other side of said coil, a further combination of star-connected resistors relative to the three phases of said network having a further star point, a connection from said further star point to one side of the other coil, and a controlled diode connected between said one side of the other coil and said one side of said one coil.

2. An arrangement for checking the state of and for drying, by means of electro-osmosis, the insulation of a three-phase electrical network including cables, windings of motors, transformers etc.; said arrangement comprising essentially a two-coil electromagnetic relay with opposed coils, a system of star-connected resistors and a system of star-connected rectifiers; wherein one coil of said electromagnetic relay is shunted with a capacitor and connected through a resistor between earth and the star point of said rectifiers connected in star with the phase leads of the network and the star point of said system of star connected rectifiers; and the star of said star connected resistors is connected with earth through a controlled diode and said resistor.

3. Apparatus for checking the state of and for drying, by means of electro-osmosis, the insulation of a single-phase network with conductors insulated from earth, comprising a two-coil electromagnetic relay with oppositely connected coils, a capacitor shunting one coil, a resistor connected between earth and one side of said one coil, rectifiers connected respectively with the conductors of the network through resistors with said rectifiers being mutually connected to the other side of said coil, further resistors connected to the conductors of the network and to a mutually common point, a connection between said common point and one side of the other of said coils and a controlled diode connected between said one side of the other of said coils and said one side of said one coil.

4. An arrangement for checking the state of and for drying, by means of electro-osmosis, the insulation of a single-phase network with conductors insulated from earth, including cables, windings of electrical equipment etc.; said arrangement comprising essentially a two-coil electromagnetic relay with opposed coils; wherein one coil of said relay is shunted with a capacitor and connected through a resistor between earth and the point of inter-connection of two rectifiers connected with the conductors of the protected network through a resistor; the second coil of said relay is connected between the common point of resistors connected to the conductors of the protected network and the point of interconnection of said two rectifiers through a resistor; and the common point of said resistors is connected through a controlled diode with said resistor connected with earth.

References Cited by the Examiner

UNITED STATES PATENTS

| 1,817,526 | 8/1931 | Rudenberg | 317—29 |
| 1,874,142 | 8/1932 | Tingley | 317—29 |

FOREIGN PATENTS

| 497,697 | 12/1950 | Belgium. |
| 675,514 | 7/1952 | Great Britain. |
| 141,922 | 3/1961 | U.S.S.R. |
| 144,214 | 6/1961 | U.S.S.R. |

MILTON O. HIRSHFIELD, *Primary Examiner.*

SAMUEL BERNSTEIN, *Examiner.*

R. V. LUPO, *Assistant Examiner.*